United States Patent
Normant

[11] Patent Number: 5,910,785
[45] Date of Patent: Jun. 8, 1999

[54] METHOD FOR THE PROCESSING OF THE RECEPTION SIGNAL OF A SYNTHETIC APERTURE RADAR WITH FREQUENCY RAMPS

[75] Inventor: Eric Normant, Montigny le Bretonneux, France

[73] Assignee: Thomson-CSF, Paris, France

[21] Appl. No.: 09/069,989

[22] Filed: Apr. 30, 1998

[30] Foreign Application Priority Data

May 7, 1997 [FR] France ................................ 97 05624

[51] Int. Cl.[6] .................................................... G01S 13/00
[52] U.S. Cl. .............................. 342/25; 342/25; 342/179; 342/194; 342/195; 342/196
[58] Field of Search ......................... 342/25, 194, 179, 342/195, 196

[56] References Cited

U.S. PATENT DOCUMENTS

| | | | |
|---|---|---|---|
| 4,908,625 | 3/1990 | Anthouard et al. .................. | 342/25 |
| 4,985,704 | 1/1991 | Smith ................................... | 342/25 |
| 5,608,404 | 3/1997 | Burns et al. ......................... | 342/25 |

*Primary Examiner*—Daniel T. Pihulic
*Attorney, Agent, or Firm*—Oblon, Spivak, McClelland, Maier & Neustadt, P.C.

[57] ABSTRACT

A Deramp type radar used in synthetic aperture radar for radar imaging transmits coherently repeated linear frequency-modulated pulses and carries out a sort of pulse compression in reception by demodulation of the echo signals received by means of a frequency ramp that reproduces all or part of a transmitted pulse, and by a Fourier transform performed in range. With this type of pulse compression, a parasitic phase modulation appears on the signal delivered by a Deramp type radar. This parasitic phase modulation disturbs the standard SAR procession operations for the construction of radar images. The proposed method is used to eliminate the detrimental effects of this parasitic phase modulation on the construction of a radar image. It consists of the adoption of a particular temporal support for the demodulation and of the correction of the parasitic phase modulation that appears with this particular temporal supports chiefly by a phase correction in the pulse response of the image focusing filter and, secondarily, by a another phase correction in the complex reflection coefficients obtained for the points of the image at the end of the SAR processing. FIG. 7.

7 Claims, 5 Drawing Sheets

METHOD FOR THE PROCESSING OF THE RECEPTION SIGNAL OF A SYNTHETIC APERTURE RADAR WITH FREQUENCY RAMPS

BACKGROUND OF THE INVENTION

Field of the Invention

Synthetic aperture radars (SARs) are used to obtain high-resolution images of the ground in all weather conditions from a moving carrier. They illuminate the ground in a direction lateral to the route of the carriers by a coherently repeated recurrent electromagnetic waveform, receive the sum of the echoes sent back by the ground and analyze this sum of echoes received throughout the route of the carrier for the deduction therefrom of the reflection coefficients of the different points of the zone examined in order to form a radar image. The phase coherence from one recurrence to another enables analysis of the Doppler history of the different targets and therefore makes it possible to separate them in azimuth, i.e. separate them along the direction of motion of the carrier identified on an axis known as an azimuth axis. The resolution in the direction perpendicular to that of the movement of the carrier identified by an axis called the range axis is done as a function of the echo return time. It is improved conventionally by the pulse compression technique.

The data elements delivered at reception by an SAR type radar are constituted by a sampling of the unprocessed video signal received at a double rate: a fast rate corresponding to the sequence of range gates that subdivide the listening time of the radar after each transmission of a waveform and a slow rate corresponding to the succession of recurrences of the transmitted waveform. The result thereof is that, for the image processing of a 2D data table, the following are available: a range dimension along which the samples of the unprocessed video signal received in response to the transmission of a waveform are aligned, these samples being taken at the fast sampling rate, and an azimuth dimension along which there are arranged the successive sequences of samples of the unprocessed video signal received for the various recurrences of the transmitted waveform.

The image processing operation consists of the extraction of an image from a 2D table such as this that brings together the unprocessed video samples received by the radar during the illumination of a zone. This extraction is done by separating the contributions, to the total echo, of each point of the zone in taking account of the specific progress of the range and azimuth coordinates of the point considered during the illumination of this point by the radar moving above the zone. The range coordinate progresses as follows: the radar approaches the point until it passes through the perpendicular to this point and moves away from this point. The phenomenon is known as the range migration phenomenon. The progress of the azimuth coordinate consists of an approach at decreasing speed implying a Doppler effect at decreasing positive frequency followed by a moving away at increasing speed implying a Doppler effect at increasing negative frequency with cancellation of the Doppler effect when the radar passes through the perpendicular to the point. This phenomenon is known as the Doppler history.

If we set aside the pulse compression, the image processing consists of the following steps for each point of the zone illuminated by an SAR type radar: selecting the azimuth domain in the table of unprocessed video samples corresponding to the period of illumination of the point considered by the radar; then, in this azimuth domain, identifying the band of samples to which the point considered has contributed by its echo, in taking account for this purpose of the range migration; finally, filtering the collection of samples of this band to take account of the Doppler history of the point considered and extract its complex reflection coefficient therefrom. These operations which are necessary for each point of an imaged zone are done so as to limit, as far as possible, the quantity of calculations performed.

A theoretical analysis of the nature of the operations, including a possible preliminary pulse compression operation, that have to be conducted on the 2D range and azimuth table of the unprocessed video reception samples delivered by an SAR type radar in order to obtain an image, shows that these operations can be interpreted as a 2D filtering of the table in the range and azimuth dimensions. This filtering is done by means of a so-called image focusing filter whose pulse response $h(\tau,t,\tau_i)$ to two temporal variables, $\tau$ range and t azimuth, is not stationary in range. This justifies the presence of a second range parameter $\tau_i$ in its expression. From this, there follows a standard method of processing the table of unprocessed video reception samples delivered by an SAR type radar. This standard method consists in:

determining the pulse response $h(\tau,t,\tau_i)$ to two temporal variables, namely $\tau$ range and t azimuth, locally valid in the range bands $\tau_i$ where this response is assumed to remain stationary, that define the image focusing 2D filter carrying out the following at the same time: the pulse compressions the correction of range migration and the extraction of the frequency components corresponding to the Doppler history. This determining of the pulse response is done on the basis of the properties of the waveform transmitted and the geometrical parameters of the image being taken, convoluting this image focusing filter pulse response with the table of unprocessed video signal samples received, subdivided beforehand into range bands through direct and reverse 2D Fourier transform operations, to return to the spaces of the range and azimuth frequencies and avoid integration computations inherent in a convolution, and combining the image bands obtained to reconstitute a full image.

It is shown that a certain economy of computation can be achieved by performing the pulse compression operations prior to the image processing operations.

The pulse compression which enables improvement in the range resolution can be done on several waveforms emitted, and especially on a waveform constituted by a coherently repeated linear frequency-modulated pulse. In theory, the pulse compression consists in filtering the signal received with a filter matched to the waveform transmitted or again in correlating the received signal with the transmitted waveform. This operation is difficult to achieve, and is often costly in terms of computation. This is why it is often sought to replace it with simpler processing operations giving similar results. One example thereof is provided by a type of radar known as the Deramp radar which transmits coherently repeated linear frequency-modulated microwave pulses and carries out a sort of pulse compression in reception, not by matched filtering but by a demodulation of the signal received by the transmitted pulses and a frequency analysis of the demodulated signal received. For details of the Deramp radar, reference may be made to: [1] J. P. HARDANGE, P. LACOMME and J. C. MARCHAIS, "Radars aéroportés et spatiaux" (Airborne and space radars), Masson 1995, pp. 168–170.

In a Deramp radar, advantageous use is made of the fact that with a linear frequency-modulated pulse, there is a relationship of proportionality between the time that elapses and the instantaneous frequency of the pulse. Through this instantaneous frequency, the mixing of two pulses that are staggered in time such as a transmitted pulse and the echo pulse that is returned by a point target gives a signal whose frequency is constant with respect to time and depends on the relative delay between two pulses. Thus, the correlation between the transmitted and received waveforms that results in the pulse compression can be replaced by a simple demodulation of the signal received by the transmitted signal followed by a Fourier transform with minor differences in the result.

The operational advantage of the processing done in a Deramp radar with a view to pulse compression is that it enables very high range resolution with a narrow instantaneous band receiver. In the case of use in imaging, this is done to the detriment of the width of the processed swath, i.e. the useful duration of reception between each waveform transmitted for the useful instantaneous band in the receiver is proportional to the duration of the swath processed. This mode of pulse compression is therefore particularly suited to very high resolution radar imaging systems on regions that are not extensive in distance.

The use of a Deramp type radar as a synthetic aperture radar to carry out radar imaging raises difficulties owing to the particular properties of its demodulated reception signal. Indeed, this signal has the property, in relation to the target echo signal from which it originates, of having a delay that is variable as a function of the position in range of the target in the swath, namely in the zone illuminated by the transmitted pulse and also of having a variable duration, smaller than that of the target echo signal from which it originates, depending also on the position in range of the target in the swath. Its delay, which is variable with respect to the echo signal from which it originates, generates a parasitic phase that disturbs the subsequent operation of image construction processing and adversely affects the sharpness of the image while its variable duration gives the Deramp type radar a resolution that is variable in range and also affects the sharpness of the image.

The present invention is aimed at resolving these difficulties in order to obtain a radar image that is as sharp as possible.

SUMMARY OF THE INVENTION

An object of the invention is a method for the processing of the reception signal of an SAR with frequency ramps to obtain a radar image. The SAR is placed on board a carrier moving above a region of terrain to be imaged that it illuminates. It sends out coherently repeated linear frequency-modulated pulses with a duration T, demodulates the echo signal received in return between each transmitted pulse by means of a demodulation ramp that is centered in range on the middle of the useful illuminated zone or useful swath, resumes the form of all or part of the transmitted pulse and has a duration $T_d$ smaller than or equal to the duration T of a transmitted pulse, sufficient to cover the reception time interval where the echo signals of all the targets of the useful swath overlap, after demodulations delivers an unprocessed video reception signal available in the form of successive samples or reception data elements that are taken at a double rate: a fast rate corresponding to the sequence of range gates and defining a temporal dimension of range $\tau$ along a range axis oriented laterally to the path of the carrier of the SAR and a slow rate corresponding to the succession of recurrences and defining a temporal dimension of azimuth t along an azimuth axis oriented in the direction of shift of the carrier of the SAR, these samples or data elements taking the form of a table of reception data with two dimensions, range and azimuth. This method comprises the following successive processing steps:

the selection of a useful duration $T_a$ for the demodulation beginning at the earliest at the instant of the start of reception of an echo sent back by a target placed in range at the far end of the useful swath and ending at the latest at the instant of the end of reception of an echo sent back by a target placed in range at the near end of the useful swath, the replacement of the data elements of the table of reception data, considered in the range dimension, by their Fourier transform which is one-dimensional in range for the obtaining, after demodulation, of a type of pulse compression to which there is assigned a parasitic phase term of pulse compression, the rearrangement of the data elements of the table in the range dimension in order to have available data corresponding to an order of moving away that increases in range, the subdivision of the table into overlapping bands, parallel to the azimuth axis, so as to have bands corresponding to narrow zones of range $\tau_i$ where it is possible, as a function of the geometrical parameters of the image taken, to locally determine a image focusing 2D filter having a pulse response $h(\tau,t,\tau_i)$ with two temporal variables, namely $\tau$ range and t azimuth, and a function of correction of the parasitic phase due to the pulse compression, that are stationary in the range band $\tau_i$, the filtering of the table bands by the image focusing 2D filter whose pulse response has been modified by the parasitic phase correction function, and the juxtaposition of the table bands resulting from the filtering to obtain a table of complex reflection coefficients of the points of the illuminated region of ground, and the construction of an image of the illuminated region from the moduli of the complex reflection coefficients represented in the table obtained in the previous step.

Advantageously, the useful duration $T_a$ of demodulation is selected by the adoption of a demodulation ramp whose duration $T_d$ corresponds to this useful duration $T_a$.

According to one variant, the selection of the useful duration $T_a$ of demodulation is done on the 2D table of reception data, before this table has undergone the one-dimensional range Fourier transform, by the withdrawal of the reception data elements arriving in relation to the range axis outside the useful duration $T_a$ chosen and the replacement of these data elements by zero values.

Advantageously, the 2D filtering of the table bands by the image focusing 2D filter whose pulse response has been modified by the parasitic phase correction function is obtained by going into the spaces of the range and azimuth frequencies, by other 1D direct and reverse Fourier transform operations in the two dimensions of range and azimuth of the data tables so as to avoid computations of convolution.

BRIEF DESCRIPTION OF THE DRAWINGS

Other features and advantages of the invention shall appear from the following description of an embodiment given by way of an example. This description shall be made with reference to the drawings wherein.

MORE DETAILED DESCRIPTION

Figure 1:
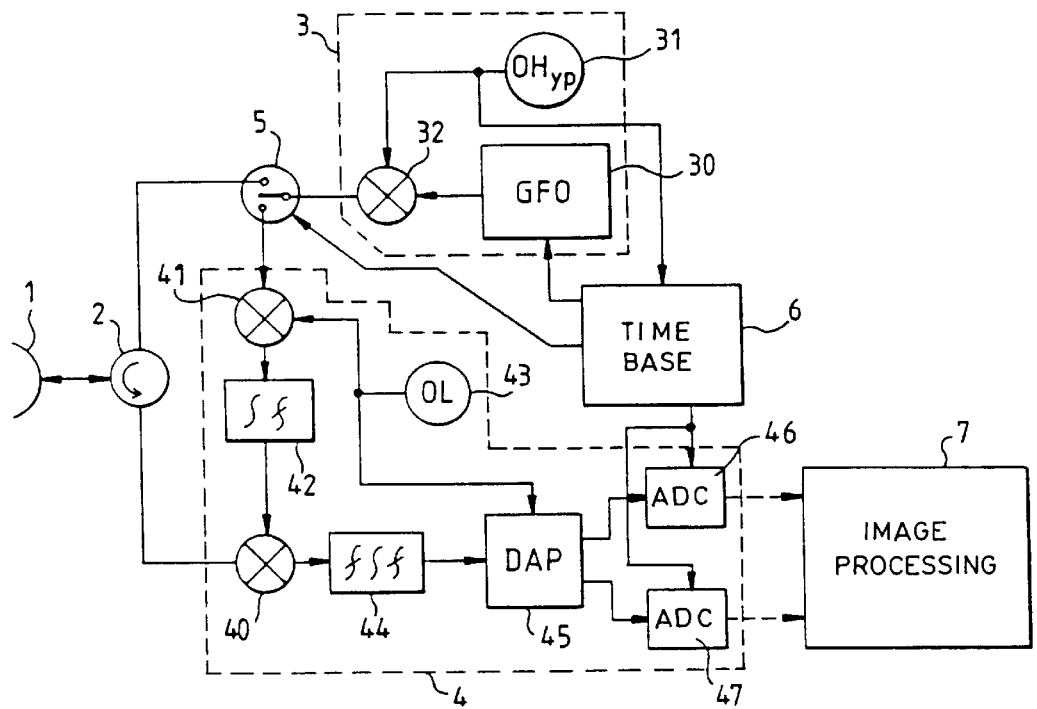
FIG. 1 provides a schematic view of a Deramp type synthetic aperture radar.

FIG. 1 is a block diagram of a monostatic synthetic aperture radar with pulse compression. This radar is known by the terms "Deramp Radar, Deramping Radar, Dechirping Radar etc.". The radar, mounted on a carrier moving above a region of the ground to be imaged, consists of an antenna 1 connected by a circulator 2 to a transmission part 3 and a reception part 4 with an inverter switch 5 that is placed between the transmission part 3 and the circulator 2 and enables the extraction, from the transmission part 3, of a demodulation signal for the reception part 4, a time base 6 organizing the sequencing of the various signals and finally an image processing circuit 7 that is often kept at a range on the ground in a telemetry station. This image processing circuit 7 constructs an image from the unprocessed video data delivered by the reception part 4.

The transmission part 3 has a waveform generator GFO 30 generating linear frequency ramps at an intermediate frequency, a microwave source $OH_{yp}$ 31 generating a microwave carrier and a mixer 32 connected to the outputs of the waveform generator GFO 30 and of the microwave source $OH_{yp}$ 31 in order to deliver linear frequency-modulated microwave pulses to the inverter switch 5 and beyond, to the circulator 2 and the antenna 1 as well as to the reception part 4.

The reception part 4 has a demodulation mixer 40 placed at input and receiving a microwave signal coming from the circulator 2 and the antenna 1, and a demodulation signal coming from the transmission part 3. This demodulation signal consists of linear frequency-modulated microwave pulses generated by the transmission part 3. These pulses are diverted by means of the reversal switch 5 and translated into a higher frequency band by means of a mixer 41. This mixer is followed by a highpass filter 42 and receives signals from a local oscillator OL 43 at intermediate frequency. The demodulation mixer 40 is followed by a bandpass filter 44 enabling the selection of the useful frequency zone, namely the range domain observed or the useful swath, an amplitude-phase demodulator DAP 45 receiving the intermediate frequency carrier from the local oscillator OL 43 and two analog-digital converters 46, 47. These two analog-digital converters 46, 47 carry out the sampling and conversion into digital form of the phase and quadrature parts of the unprocessed reception video signal, at a double rate: a fast rate corresponding to the succession of range gates subdividing the listening time of the radar between each of the transmissions of linear frequency-modulated pulses and a slow rate corresponding to the succession of linear frequency-modulated pulses transmitted.

The time base 6 carries out the sequencing of the linear frequency-modulated pulses generated by the transmission part 3 in order that they may be repeated coherently with respect to the microwave signal from the microwave source 31. Secondly, the time base 6 operates the inverter switch 5 so that, between each linear frequency-modulated pulse transmitted to the antenna 1 and the next one, there is a linear frequency-modulated pulse diverted to the reception part 4 for the demodulation. Thirdly, the time base sets the double rate of sampling of the unprocessed reception video signal performed by the analog-digital converters 46, 47 of the reception part 4. To accomplish this task, the time base 6 is synchronized with the signal of the microwave source 31 of the transmission part.

Owing to this double sampling rate, it is usual to present the samples of the unprocessed reception video signal delivered by the reception part 4 in the form of a table with two dimensions: a range dimension along which there are aligned the samples of the unprocessed video signal received in response to the transmission of a linear frequency-modulated pulse and an azimuth dimension along which there are arranged the successive sequences of samples of unprocessed video signals received for the various linear frequency-modulated pulses transmitted. A table such as this, containing samples of unprocessed video reception signals, is then transmitted to an image processing device 7 in order to be processed therein in the two dimensions of range and azimuth in order to get an image therefrom.

Figure 2:
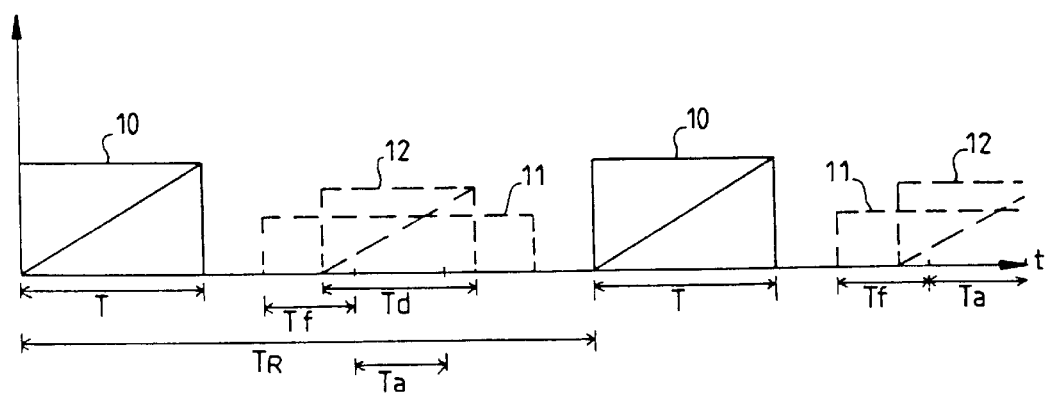
FIG. 2 is a timing diagram explaining the sequencing of the signals transmitted and received by the radar of FIG. 1.

FIG. 2 shows the sequencing of the different signals of a Deramp type pulse compression SAR. This figure shows the transmitted pulses 10 with a duration T. They are linear frequency-modulated pulses that succeed one another at the end of a period $T_R$ leaving a duration $T_R-T$ between them for reception. The duration $T_R-T$ between the transmitted pulses is taken up by a reception period 11 that starts with the beginning of an echo due to a near target located at the beginning of the useful swath and ends with the end of an echo due to a distant target located at the end of the useful swath. Somewhere during the period of reception, there appears a demodulation pulse 12 that is the copy of a part of the pulse emitted with a duration $T_d$. This demodulation pulse 12 appears with the delay such that it is centered on the middle useful swath. Two interesting periods of time appear in this FIG. 2, the period $T_f$ which corresponds to the duration of the useful swath and is the time interval between the reception of the echoes from the targets located at the beginning and end of the swath and the period $T_a$ which is the usual duration of analysis, in this case the time during which the echoes sent back by the target located in the useful swath are received simultaneously.

Figure 3:
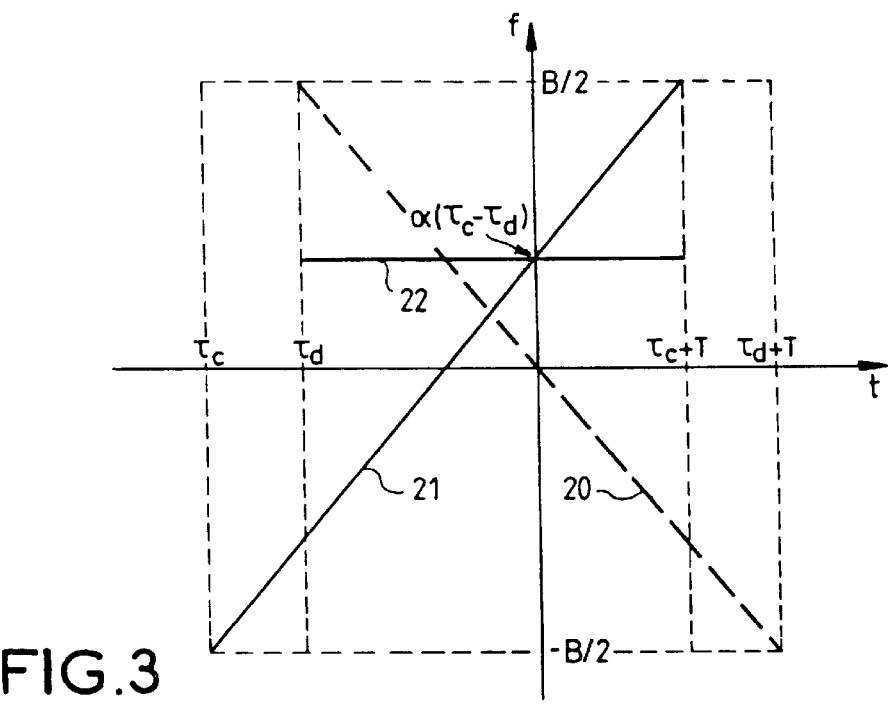
FIG. 3 is a graph in the time-frequency domain explaining the way in which an operation of demodulation and pulse compression is carried out in a Deramp type radar.

FIG. 3 illustrates the principle of demodulation of a linear frequency-modulated pulse.

In the time-frequency domain, a linear frequency-modulated pulse may be likened to a straight line with a slope α such that:

$$|\alpha| = \frac{B}{T}$$

where B is the frequency band of the pulse and T is its duration. It may be assumed here that we are dealing with linear frequency-modulated pulses in the increasing order of frequencies and hence that the straight lines that represent them are ramps with a positive slope α. Furthermore, for convenience's sake, the figure shows a pulse used for the demodulation or demodulation ramp with a negative slope −α for, in this case, the demodulation process which consists of a subtractive mixture of two instantaneous frequencies is expressed in the figure as the point-to-point sum of the useful signal and of the demodulation signal. With this convention which shall remain valid hereinafter in the description, and taking the center of the demodulation pulse as the starting point of the coordinates, the demodulation ramp appears as a straight line segment 20 with a negative slope −α. This straight line segment 20 is represented by dashes and passes through the starting point. It starts at an instant $\tau_d$, ends at an instant $\tau_d+T_d$, $T_d$ being the duration of the demodulation ramp and occupies a frequency band $[+B_a/2, -B_a/2]$. An echo coming back from a target appears as a straight line segment 21 with a slope α that is represented by a solid line. This straight line segment 21 starts at an instant $\tau_c$ at the bottom −B/2 of the frequency band of a transmitted pulse and ends at an instant $\tau_c+T$ at the peak B/2 of the frequency band of a transmitted pulse. The result thereof is that, after demodulation, it gives an unprocessed video signal constituted by a pure frequency:

$$f_{c/d} = -\alpha(\tau_c - \tau_d)$$

represented in FIG. 3 by a horizontal straight line segment 22 in a solid line that starts at whichever is the latest of the instants $\tau_c$ or $\tau_d$, in this case the instant $\tau_d$ and ends at whichever the earliest of the instants $\tau_c+T$ or $\tau_d+T$, in this case the instant $\tau_c+T$. It can be seen therefore that the unprocessed video reception signal resulting from the demodulation of the echo due to a target is a sine signal whose frequency is proportional to the relative delay of the echo of the target with respect to the instant at which the demodulation ramp is started.

More specifically, it is possible to express the transmitted signal, the received signal received associated with a target corresponding to a propagation time $\tau_c$ and the demodulation signal started at the instant $\tau_d$ respectively by:

$$\begin{cases} p(\tau) = rect\left[\frac{\tau}{T}\right]\cos 2\pi\left(f_c\tau + \frac{1}{2}\alpha\tau^2\right) \\ p(\tau - \tau_c) \\ p(\tau - \tau_d)rect\left[\frac{\tau}{T_d}\right] \end{cases}$$

where $f_c$ is the center frequency of a pulse, α the ratio of the frequency band B of a pulse transmitted on its duration T and $T_d$ the duration of the demodulation ramp. At the end of the demodulation, the received signal associated with this target is therefore given by:

$$p(\tau - \tau_c)p(\tau - \tau_d) = rect\left[\frac{\tau - \tau_c}{T}\right]rect\left[\frac{\tau - \tau_d}{T_d}\right] \times \frac{1}{2}$$
$$\{\cos[-2\pi f_c(\tau_c - \tau_d) + \pi\alpha(\tau_c^2 - \tau_d^2) - 2\pi\alpha(\tau_c - \tau_d)\tau] +$$
$$\cos[4\pi f_c\tau - 2\pi f_c(\tau_c + \tau_d) + \pi\alpha\{(\tau - \tau_c)^2 + (\tau - \tau_d)^2\}]\}$$

The second cosine term disappears after bandpass filter 44 which comes into play just after the demodulation. The role of the bandpass filter 44 is to eliminate the image frequencies generated by the demodulation mixer 40 and also, as specified here above, to select the useful subdivision and prevent the targets in the vicinity of the useful swath from acting as parasites with respect to the useful swath after sampling.

The first cosine term which is the only one to remain after demodulation and filtering shows that the unprocessed video reception signal coming from a target is a sine signal. The frequency $-\alpha(\tau_c-\tau_d)$ of this sine signal is proportional to the relative delay of the target with respect to the instant at which the demodulation ramp is started, as was already seen in the time-frequency graph of FIG. 3, and its phase shift is a function of the echo propagation time $\tau_c$ and of the instant $\tau_d$ at which the demodulation signal is started.

The echo signal $v_0(\tau,t)$ received before decompression at an instant corresponding to range τ and an instant corresponding to azimuth t results from a 2D range and azimuth convolution between the complex reflectivity of the illuminated ground γ(τ,t), this complex reflectivity being sought in order to plot the image of the ground, and the product of multiplication between the type of pulse transmitted p(τ) and the pulse response $h_{SAR}(\tau,t)$ of the image focusing filter, this response being determined without taking account of the range pulse compression, solely as a function of the geometrical parameters of the image being taken, and this response being assumed to be stationary for a certain range band so that it is possible, for this range band, to write:

$$v_0(\tau, t) = \int\int \gamma(\tau', t')$$
$$p\left(\tau - \frac{T}{2} + \tau_0 - \tau_c(t - t' - T_e/2) - \tau'\right)h_{az}(t - t' - T_e/2)d\tau'dt'$$

where:

$\tau_0$ designates the instant from which the samples of unprocessed video reception signals begin to be recorded, $\tau_c$ is the time of propagation of the echo signal from a target, $T_e$ is the period of illumination of a target by the radar moving past in azimuth, p(τ) designates the type of pulse transmitted, $h_{SAR}(t)$ is the pulse response of the image focusing filter where the pulse compression is not taken into account. This pulse response depends implicitly on the range variable τ, which is not mentioned for the sake of simplicity, and is such that:

$$h_{SAR}(t) = rect\left[\frac{t}{T_e}\right]g_{az}(t)\exp[-i2\pi f_c\tau_c(t)]$$

the constant phase term $\exp[i2\pi f_c\tau_d]$ being omitted with a view to simplification, $f_c$ designing the center frequency of a transmitted pulse and $g_{az}(t)$ the azimuth aperture pattern of the radar antenna.

Hereinafter in the development of the description, in order to make the mathematical expressions less cumbersome, the following convention will be adopted:

$$\tau_c(t - t' - T_e/2) \Leftrightarrow \tau_c$$

The transmitted pulse being a linear frequency-modulated pulse in the B frequency band with a duration T and a modulation slope $|\alpha|=B/T$, it can be admitted that:

$$p(\tau) = rect\left[\frac{\tau}{T}\right]\exp\left[i2\pi\frac{1}{2}\alpha\tau^2\right]$$

The demodulation ramp is characterized by the instant $\tau_d$ at which it is started and its duration $T_d$. The expression of its complex envelope is given by:

$$r_d(\tau) = p_d^*\left(\tau - \frac{T_d}{2} - \tau_d + \tau_0\right)$$

It is deduced therefrom that the expression of the signal received after demodulation is written as follows:

$$v_1(\tau, t) = \int\int \gamma(\tau', t') h_{SAR}(t - t' - T_e/2) \times \qquad (1)$$

$$p\left(\tau - \frac{T}{2} + \tau_0 - \tau_c - \tau'\right) p_d^*\left(\tau - \frac{T_d}{2} + \tau_0 - \tau_d\right) d\tau' dt'$$

The analysis of this expression shows that in order to be capable of assessing the complex reflectivity $\gamma(\tau,t)$ of the ground illuminated by the radar in order to construct a radar image thereof, it is not enough to know the pulse response $h_{SAR}(t)$ of the image focusing filter defined in the absence of a pulse compression but that is necessary, in addition, to be capable of assessing the products of multiplication between the pulse echoes returned by the targets p( ) on the one hand and the demodulation ramp $P_d^*$ ( ) on the other. This product, once it is developed, contains two terms:

a term defining a temporal support:

$$rect\left[\frac{\tau - T/2 + \tau_0 - \tau_c - \tau'}{T}\right] \times rect\left[\frac{\tau - T_d/2 + \tau_0 - \tau_d}{T_d}\right]$$

a phase term associated with the demodulation:

$$\exp\left[i2\pi\frac{1}{2}\alpha\{(\tau - T/2 + \tau_0 - \tau_c - \tau')^2 - (\tau - T_d/2 + \tau_0 - \tau_d)^2\}\right]$$

which can be written again as follows:

$$\exp\left[i2\pi\frac{1}{2}\alpha\left\{(\tau_c + \tau')^2 - \tau_d^2 + \frac{T^2}{4} - \frac{T_d^2}{4} + T(\tau_c + \tau') - T_d\tau_d\right\}\right]$$

$$\exp[-i2\pi\alpha\{(\tau_c + \tau') - \tau_d + (T - T_d)/2\}(\tau + \tau_0)]$$

The temporal support defines the time interval during which the echo signal sent back by a target exists and is demodulated. This time interval has a position on the range axis and a duration that are variable as a function of the position in range of the target considered in the useful swath and of the position in range of the demodulation ramp which is usually the middle of the useful swath. A constant range resolution on the useful swath dictates the adoption of temporal supports of the same duration for the echo signals of all the targets, whatever their positions in range in the useful swath. This leads to arrangements being made in order that the temporal supports actually used for the signals of all the targets of the useful swath will have the same duration.

The phase-shift term associated with the demodulation comes from the fact that the temporal supports of the echo signals of the targets have a position with respect to the echo signals of the targets themselves that varies as a function of the position in range of the targets.

To construct an image out of a unprocessed video reception signal delivered by a radar of the Deramp type, it is therefore necessary, in addition to the usual operations of image processing, to overcome the dependency of the duration of the temporal support used for the demodulation of the echo signal sent by a target on the position in range of this target in the useful swath. It is furthermore necessary to correct the effects of any phase term that may be associated with the demodulation due to a variation in position of the temporal support used for the demodulation of the echo signal sent back by a target with reference to the echo signal itself as a function of the position in range of the target.

To prevent any variation in the duration of the temporal support of demodulation of the echo signal sent back by a target as a function of the position in range of this target in the useful swath, it is proposed to limit it to the common part of all the echo signals sent back by the targets of the useful swath. One method consists in sizing and positioning the demodulation ramp so as to demodulate only the parts of the echo signals belonging to a temporal zone that begins at the instant of the start of reception of an echo sent back by a target placed in range at the far end of the useful swath and ends at the instant of the end of reception of an echo sent back by a target placed in range at the near end of the useful swath. There is then obtained a temporal support of demodulation with a constant duration $T_a$ equal to the duration $T_d$ of the demodulation ramp itself smaller than the duration T of a transmitted pulse.

Figure 4:
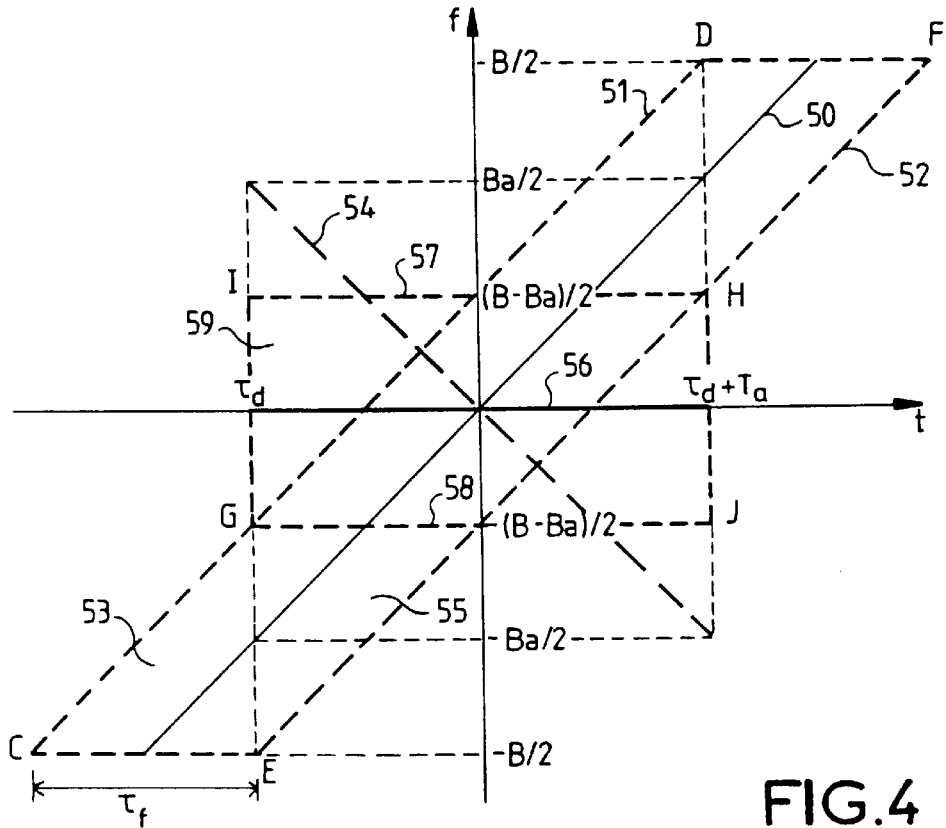
FIG. 4 is a graph in the time-frequency domain explaining the choice made, in the method according to the invention, of a common time interval adopted for the demodulation of all the echo signals returned by a useful ground region or swath in response to a pulse sent out by the radar of FIG. 1, FIGS. 5 and 6 are diagrams explaining the rearrangement made, after the first Fourier transform in range, on the data table delivered by a Deramp radar used in synthetic aperture radar for the obtaining, after pulse compression, of the data elements positioned in the table in a rising order of range.

FIG. 4 is a time-frequency graph that illustrates this choice. This figure shows a system of time-frequency axes whose temporal origin is the echo propagation time corresponding to the middle of the useful swath and whose frequency origin is the middle of the frequency band [−B/2, B/2] of a transmitted pulse. In this system of time-frequency axes, the following are plotted:

a straight line segment 50 with a slope α represented by a solid line, passing through the starting point and corresponding to the response to a transmitted pulse, from a target located in range, in the middle of the useful swath. This response is centered on the starting point and lasts for a period T of a transmitted pulse, two straight line segments CD and EF 51, 52 with a slope α shown in dashes on either side of the straight line 50 and corresponding to the responses of two targets to a transmitted pulse: one segment 51 is located in range at the beginning of the useful swath and the other segment 52 is located in range at the end of the useful swath. These two parallel straight line segments 51 and 52 are separated in time by a duration $T_f$ corresponding to the width in range of the useful swath. Their ends CDEF form the corners of a parallelogram 53 which, in the time-frequency domain, demarcates the surface occupied by the echoes sent back by all the targets of the useful swath, a straight line segment 54 with a slope −α shown in dashes, passing through the starting point and corresponding to the demodulation ramp used. This ramp begins in time at an instant $\tau_d$ placed at the start of reception of an echo 51 from a target located in range at the far end of the useful swath and ends in time at an instant $\tau_d+T_d$ placed at the end of the reception of an echo 52 from a target located in range at the near end of the useful swath.

With this position and sizing of the demodulation ramp 54, the temporal supports used for the demodulation of the echoes from all the targets of the useful swath are all intermingled with a fixed duration $T_a$ equal to the duration $T_d$ of the demodulation ramp. The demodulation ramp 54, which is centered on the starting point of the axes corresponding to the midpoint of the useful swathe occupies a time interval $[\tau_d, \tau_d+T_d]$ or $[\tau_d, \tau_d+T_a]$ smaller than the duration T of a transmitted pulse and a frequency band $[-B_a/2, B_a/2]$ smaller than the frequency band $[-B/2, B/2]$ of a transmitted pulse.

The parts to be demodulated of the echoes of the targets of the useful swath are thus limited to the surface of a parallelogram 55 whose corners are the points D and E, the projection G of the point E parallel to the axis of the frequencies on the straight line segment CD 51 representing the echo sent back by a target located in range at the beginning of the useful swath, and the projection H of the point D parallel to the axis of the frequencies on the straight line segment EF representing the echo sent back by a target located in range at the end of the useful swath.

After demodulation, the target echo signals are converted into pure sine signals appearing on the time-frequency graph of FIG. 4 in the form of horizontal straight line segments as was explained with reference to FIG. 3. Among these straight line segments, it is possible to distinguish the following. Firstly, there is the horizontal straight line segment 56, drawn in a bold line on the time axis. This segment 56 corresponds to the demodulation of the echo signal 51 from a target located in range at the middle of the useful swath. Then there is the straight line segment IH 57 drawn in dashes corresponding to the demodulation of the echo signal 51 from a target located in range at the beginning of the useful swath. Finally, there is the straight line segment GJ 58, shown in dashes, corresponding to the demodulation of the useful signal 52 from a target located in range at the end of the useful swath.

Thus, the demodulated signals used for the image processing are inscribed within in a rectangle IHJG 59 centered on the starting point of the axes. They therefore all have the same temporal support $[\tau_d, \tau_d+T_a]$ or $[\tau_d, \tau_d+T_d]$. At the same time, they are distributed on a frequency band $[-(B-B_a)/2, (B-B_a)/2]$ and keep variable delays with respect to the echo signals from which they originate, these delays being a function of the positions in range, in the useful swath, of the targets that have returned the echoes.

The spatial range resolution is inversely proportional to the frequency band $B_a$ of the demodulation ramp 54:

$$B_a = |\alpha| T_a$$

The middle of the temporal support used is equal by construction to the middle of the demodulation ramp, namely:

$$\tau_d + \frac{T_d}{2}$$

From this, we deduce the mathematical expression of the temporal support used for all the targets of the useful swath in taking account of the instant $\tau_0$ starting from which the samples of the unprocessed video signal of the "Deramp" radar begin to be stored:

$$rect\left[\frac{\tau + \tau_0 - \tau_d - T_d/2}{T_a}\right]$$

With the position in range of the demodulation ramp having been fixed and with the duration $T_d$ of the demodulation ramp, the duration $T_a$ of the used part of the demodulation ramp and the duration T of a transmitted pulse being known, it is possible to determine the position in range of the first target of the useful swath in observing that the end of its echo signal corresponds to the end of the temporal support used:

$$\tau_{df} = \tau_d + \frac{(T_d + T_a)}{2} - T$$

Similarly, the position in range of the last target of the useful subdivision is determined by observing that the beginning of reception of its echo corresponds to the beginning of the temporal support used:

$$\tau_{ff} = \tau_d + \frac{(T_d - T_a)}{2}$$

By using these last two expressions, we obtain the position in range from a target to the middle of the swath:

$$\tau_{mf} = \tau_d - (T - T_d)/2$$

The width of the swath is deduced therefrom:

$$T_f = \tau_{ff} - \tau_{df} = T - T_a$$

The width of the swath corresponds to the difference between the duration T of the transmitted pulse and the duration $T_d$ or $T_a$ of the demodulation ramp. It is furthermore noted that the spectral band occupied by the signals of echoes coming from the useful swath is given by:

$$B_{FI} = \frac{B}{T}\tau_f = B\left(1 - \frac{T_a}{T}\right)$$

The result thereof is that the sampling frequency $F_e$ of the analog-digital converters 46, 47 placed on the output channels of the amplitude-phase demodulator DAP 45 of the reception part of the Deramp radar, which corresponds to the fast rate of sampling in range, must be at least equal to this band $B_{FI}$ to meet the Nyquist theorem. In practice, it is necessary to take an over-sampling margin that depends on the equivalent filtering template of the receiver. This over-sampling is generally greater than it is for a mode of pulse compression by correlation for, in this case, the parasitic signals liable to undergo aliasing in the useful band include the targets neighboring the useful swath in addition to thermal noise The unprocessed video signal $v_1(\tau,t)$ delivered by the Deramp radar after a demodulation performed in such conditions can be put in the following form:

$$v_1(\tau, t) = \int\int \gamma(\tau', t') h_{SAR}(t - t' - T_e/2) rect\left[\frac{\tau + \tau_0 - \tau_d - T_d/2}{T_a}\right]$$

$$\exp\left[i2\pi\frac{1}{2}\alpha\left\{(\tau_c + \tau')^2 - \tau_d^2 + \frac{T^2}{4} - \frac{T_d^2}{4} + T(\tau_c + \tau') - T_d\tau_d\right\}\right]$$

$$\exp[-i2\pi\alpha\{(\tau_c + \tau') - \tau_d + (T - T_d)/2\}(\tau + \tau_0)]d\tau'dt'$$

The rectangular window function rect( ) which no longer depends on the integration variables $\tau'$ and $t'$, may be taken out of the double integral and no longer constitutes an obstacle to its computation. All that remains to be done then is to take account of the phase terms associated with the demodulation.

After demodulation, the unprocessed video signal delivered by a Deramp radar is subjected to a Fourier transform in range with possible weighting in order to discern the targets, each of which has a frequency depending on its delay with respect to the instant at which the demodulation ramp is started. Let:

$$v_1(\tau, t) \xrightarrow{TF_\tau} v_2(F, t)$$

with $$v_2(F, t) = \int\int \gamma(\tau', t') h_{SAR}(t - t' - T_e/2)$$

$$\exp\left[i2\pi\frac{1}{2}\alpha\left\{(\tau_c + \tau')^2 - \tau_d^2 + \frac{T^2}{4} - \frac{T_d^2}{4} + T(\tau_c + \tau') - T_d\tau_d\right\}\right]$$

$$\int rect\left[\frac{\tau + \tau_0 - \tau_d - T_d/2}{T_a}\right] W\left(\frac{\tau + \tau_0 - \tau_d - T_d/2}{T_a}\right)$$

$$\exp[-i2\pi\alpha\{(\tau_c + \tau') - \tau_d + (T - T_d)/2\}(\tau + \tau_0)]e^{-i2\pi F\tau}d\tau d\tau' dt'$$

where W is a weighting window used to limit the level of the minor lobes.

Now, we have:

$$\int rect\left[\frac{\tau + \tau_0 - \tau_d - T_d/2}{T_a}\right] W\left(\frac{\tau + \tau_0 - \tau_d - T_d/2}{T_a}\right)$$

$$\exp[-i2\pi\alpha\{(\tau_c + \tau') - \tau_d + (T - T_d)/2\}(\tau + \tau_0)]e^{-i2\pi F\tau}d\tau =$$

$$\int rect\left[\frac{x}{T_a}\right] W\left(\frac{x}{T_a}\right) \exp[-i2\pi\alpha\{(\tau_c + \tau') - \tau_d + (T - T_d)/2\}(\tau_d + T_d/2)]$$

$$\exp[-i2\pi F(\tau_d + T_d/2 - \tau_0)]$$

$$\exp[-i2\pi\alpha\{(\tau_c + \tau') - \tau_d + (T - T_d)/2\}x]e^{-i2\pi Fx}dx =$$

$$T_a\exp[-i2\pi F(\tau_d + T_d/2 - \tau_0)]$$

$$\exp[-i2\pi\alpha\{(\tau_c + \tau') - \tau_d + (T - T_d)/2\}(\tau_d + T_d/2)]$$

$$wsinc[T_a\{F + \alpha(\tau_c + \tau' - \tau_d + (T - T_d)/2)\}]$$

where wsinc is the core of the pulse response and represents a weighted cardinal sine value.

Finally:

$$v_2(F, t) = T_a\exp[-i2\pi F(\tau_d + T_d/2 - \tau_0)] \int\int \gamma(\tau', t') h_{SAR}(t - t' - T_e/2)$$

$$\exp\left[i2\pi\frac{1}{2}\alpha\left\{(\tau_c + \tau')^2 - \tau_d^2 + \frac{T^2}{4} - \frac{T_d^2}{4} + T(\tau_c + \tau') - T_d\tau_d\right\}\right]$$

$$\exp[-i2\pi\alpha\{(\tau_c + \tau') - \tau_d + (T - T_d)/2\}(\tau_d + T_d/2)]$$

$$wsinc[T_a\{F + \alpha(\tau_c + \tau' - \tau_d + (T - T_d)/2)\}]d\tau' dt'$$

Once the constant terms outside the integral have been compensated for and the parasitic phase terms have been simplified, we obtain:

$$v_3(F, t) = \int\int \gamma(\tau', t') h_{SAR}(t - t' - T_e/2) \exp\left[i2\pi\frac{1}{2}\alpha\{\tau_c + \tau' - \tau_{mf}\}^2\right] \quad (2)$$

$$wsinc[T_a\{F + \alpha(\tau_c + \tau' - \tau_{mf})\}]d\tau' dt'$$

The weighting window W ( ) used may be a Hamming window such that:

$$W\left(\frac{\tau}{T_a}\right) = rect\left[\frac{\tau}{T_a}\right]\left\{k + (1 - k)\cos\left(2\pi\frac{\tau}{T_a}\right)\right\}$$

In this case, the core of the pulse response is given by:

$$wsinc(x) = k\sinc(\pi x) + \frac{1 - k}{2}\{sinc[\pi(x + 1)] + sinc[\pi(x - 1)]\}$$

where x represents the reduced variable $x = FT_a$ and where the coefficient k assumes a value smaller than 1, for example 0.58.

In reality, it is worthwhile to take the discrete Fourier transform in range solely for the samples of the table of unprocessed video reception data associated with the temporal support used for the demodulation. For it is reasonable not to introduce the parasitic samples outside this support into the computations. Mathematically, this amounts to taking the Fourier transform in range of the signal $v_1(\tau,t)$ put forward in range by $\tau_d + T_d/2 - \tau_0 - T_a/2$. Under these conditions, we obtain a new signal $v_2(F,t)$ such that:

$$v_2(F, t) = \int\int \gamma(\tau', t') h_{SAR}(t - t' - T_e/2) \times$$

$$\exp\left[i2\pi\frac{1}{2}\alpha\left\{(\tau_c + \tau')^2 - \tau_d^2 + \frac{T^2}{4} - \frac{T_d^2}{4} + T(\tau_c + \tau') - T_d\tau_d\right\}\right]$$

$$\int rect\left[\frac{\tau - T_a/2}{T_a}\right] W\left[\frac{\tau - T_a/2}{T_a}\right] \times$$

$$\exp[-i2\pi\alpha\{(\tau_c + \tau') - \tau_d + (T - T_d)/2\}(\tau + \tau_d + (T_d - T_a)/2)]$$

$$e^{-i2\pi F\tau}d\tau d\tau' dt'$$

By adopting the same approach as here above, the same expression is obtained for $v_3(F,t)$ as in the relationship (2), after compensation for a new constant term.

The signal $v_3(F,t)$ is the unprocessed video signal after pulse compression. To make it compatible with the other processing steps more specific to SAR processing, it is desirable to change its frequency variable F against a temporal variable $\tau$ that is more usual in a unprocessed video reception signal of an SAR. The following change in variable is therefore assumed:

$$\tau = -\frac{F}{\alpha}$$

The expression of the unprocessed video reception signal of the Deramp radar after pulse compression then becomes:

$$v_3(\tau, t) = \int\int \gamma(\tau', t') h_{SAR}(t - t' - T_e/2)$$

$$\exp\left[i2\pi\frac{1}{2}\alpha\{\tau_c + \tau' - \tau_{mf}\}^2\right] \times wsinc[B_a\{\tau - (\tau_c + \tau' - \tau_{mf})\}]d\tau' dt'$$

In making another change in variable, we get:

$$v_3(\tau, t) = \int\int \gamma(\tau - u - \tau_c + \tau_{mf}, t')$$

$$h_{SAR}(t - t' - T_e/2)\exp\left[i2\pi\frac{1}{2}\alpha\{\tau - u\}^2\right] \times wsinc[B_a u]du dt'$$

or again:

$$v_3(\tau, t) = wsinc[B_a\tau] *_\tau \quad (3)$$

$$\int \gamma(\tau - \tau_c + \tau_{mf}, t') \exp\left[i2\pi\frac{1}{2}\alpha\tau^2\right] h_{SAR}(t-t'-T_e/2)dt'$$

the sign $*_\tau$ designating an operation of convolution according to the temporal range variable $\tau$.

This expression shows that after pulse compression, the resultant signal is a convolution of the intrinsic pulse response of the processing (weighted cardinal sine) with the signal that is (the sub-integral term) multiplied by a parasitic phase term, delayed by the propagation time and referenced with respect to the middle of the useful swath. As indicated here above, the parasitic phase term arises out of the fact that the demodulated signals, although they all have the same temporal support, have variable delays with respect to the echo signals from which they originate, these delays being a function of the positions in range, in the useful swath, of the targets that have returned the echoes.

Figure 5:
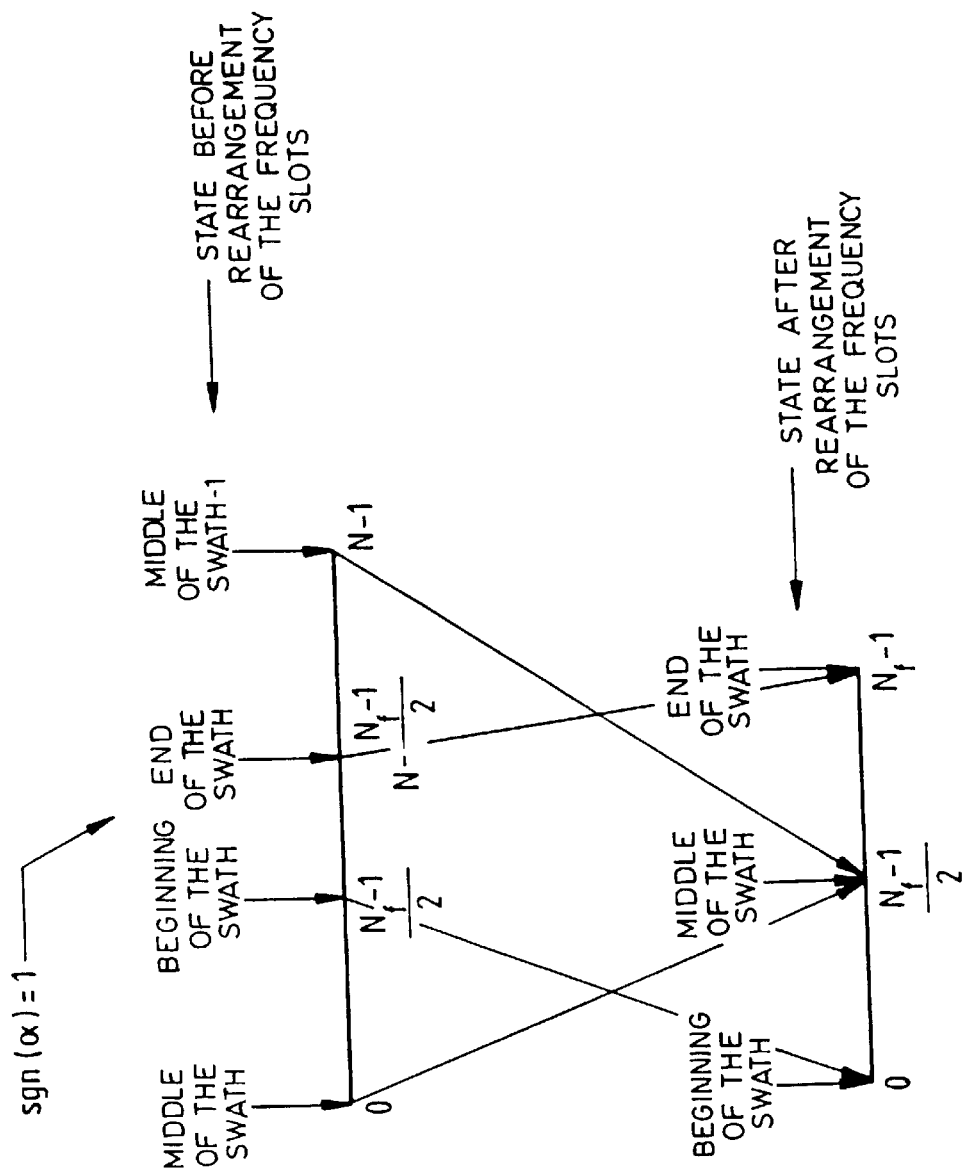
Figure 6:
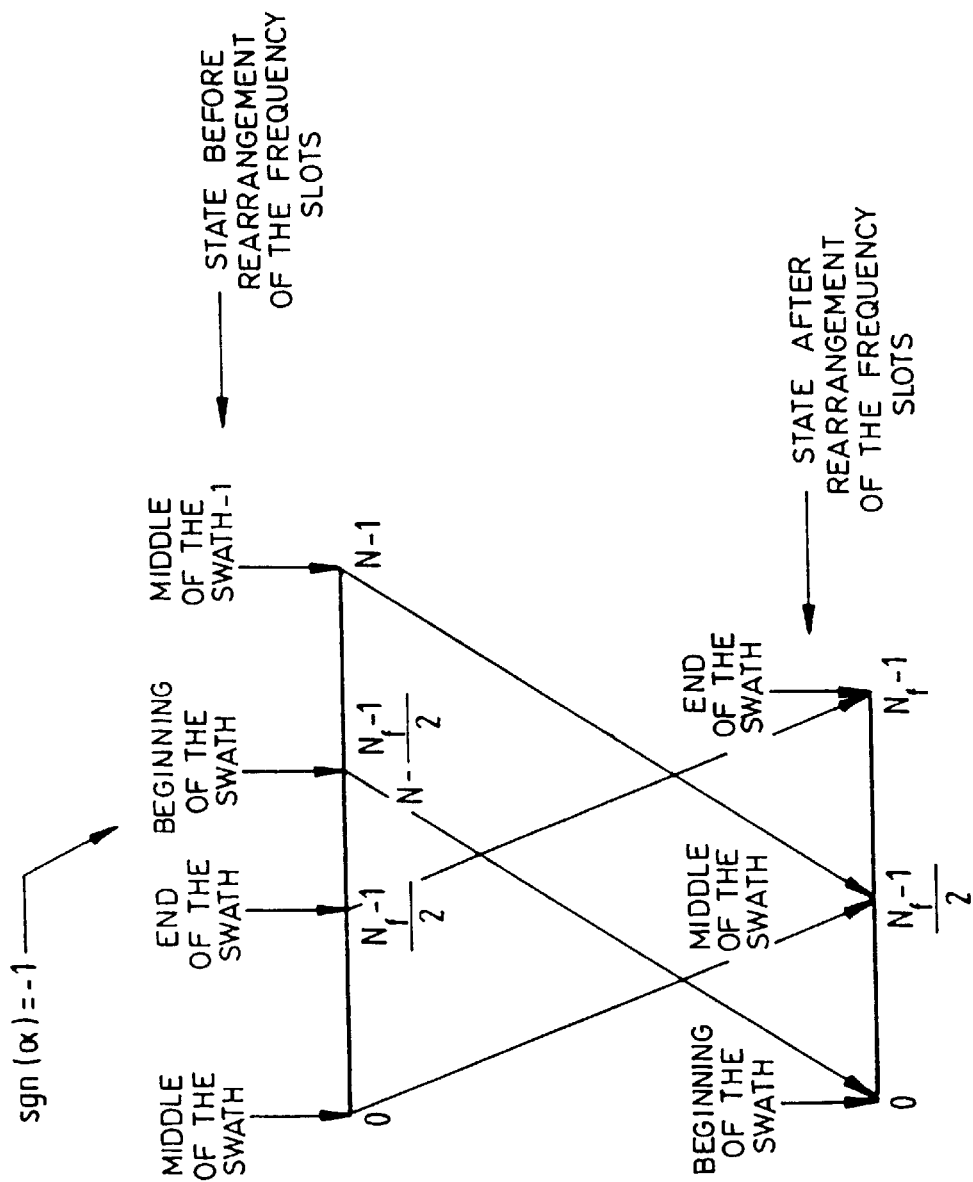

To apply an image processing operation to the table of unprocessed video reception data of a Deramp radar obtained after pulse compression by demodulation, one-dimensional Fourier transform in range and the replacement, in the range dimension, of the frequency variable F by a temporal variable $\tau$, it is necessary to re-order the range data elements so that they succeed one another in increasing order of remoteness. Indeed, the center of the useful swath is associated for example with the zero frequency. The result of this is that, by spectral aliasing, the negative frequencies associated with the echoes from the near targets appear in the domain of the positive frequencies at the top of the band occupied by the positive frequencies associated with the echoes of the distant targets as can be seen in FIGS. 5 and 6.

Indeed, if we assume that:

N is the number of samples or data elements of the table on which the Fourier transform in range has been performed, $F_e$ is the sampling frequency of the radar in range, i is the index of the current frequency slot, the relationship between a frequency slot and the associated frequency is given by:

$$\begin{cases} 0 \le i \le N/2, & F = \dfrac{iF_e}{N} \\ N/2 < i < N, & F = \dfrac{(i-N)F_e}{N} \end{cases}$$

Since the spectral band occupied by the useful subdivision covers the interval $\lfloor -B_{FI}/2, B_{FI}/2 \rfloor$, it is deduced therefrom that the number $N_f$ of useful points at output of the Fourier transform in range is equal to:

$$N_f = \text{ODD}\left[\text{rint}\left(N\frac{B_{FI}}{F_e}\right)\right]$$

where:

rint is the function that gives the integer nearest to its argument,

ODD is the function that makes its argument an integer if it is an odd number or, if not, adds 1 to it.

The permutation of the samples at output of the Fourier transform in range may therefore be done in a vector with a size $N_f$. Owing to the relationship:

$$\tau = -\frac{F}{\alpha}$$

which relates the frequency F to the propagation time $\tau$ or to the range, two cases have to be considered depending on the sign of the slope $\alpha$ of linear frequency modulation of the transmitted pulse. Resuming the notation $v_3$ for the signal or vector obtained directly after the Fourier transform in range and using $v_4$ to note the signal or vector obtained after rearrangement of the frequency slots, we get:

$$\begin{cases} \text{sign}(\alpha) = -1, \; v_4(i) = v_3\left[\left(N - \dfrac{N_f-1}{2} + i\right) \bmod N\right], \; 0 \le i \le N_f - 1 \\ \text{sign}(\alpha) = 1, \; v_4(i) = v_3\left[\left(N + \dfrac{N_f-1}{2} - i\right) \bmod N\right], \; 0 \le i \le N_f - 1 \end{cases}$$

These relationships of rearrangement are illustrated in FIG. 5 for a case where the sign of the modulation slope $\alpha$ is positive and FIG. 6 for the case where the sign of the modulation slope $\alpha$ is negative.

From the mathematical viewpoint, the rearrangement of the frequency slots results in a modification of the expression of the signal $v_3(\tau,t)$ given by the relationship (3) which becomes:

$$v_4(\tau, t) = \int\int \gamma(\tau - u - \tau_c + \tau_{mf}, t')$$

$$h_{SAR}(t-t'-T_e/2) \times \exp\left[i2\pi\frac{1}{2}\alpha\{\tau-u\}^2\right] \times w\text{sinc}[B_a u]dudt'$$

or again $$v_4(\tau, t) = w\text{sinc}[B_a\tau] *_\tau \int \gamma(\tau - \tau_c + \tau_{df}, t') \times \qquad (4)$$

$$\exp\left[i2\pi\frac{1}{2}\alpha(\tau + \tau_{df} - \tau_{mf})^2\right] h_{az}(t-t'-T_e/2)dt'$$

It is observed that the signal obtained after pulse compression by this processing mode is the result of the convolution of the intrinsic pulse response of the processing (weighted cardinal sine) with the signal that is sought multiplied by a parasitic phase term constituted by a quadratic phase centered on the middle of the useful swath.

It can thus be understood why it is unsatisfactory to compensate for the parasitic phase by multiplying the compressed signal directly by the conjugate of the parasitic phase term. Indeed, the correction is valid only for the peak of the pulse response of the pulse compression processing (peak of the weighted cardinal sine). This correction is not compatible with an SAR image extraction processing operation in the spectral 2D domain which alone is capable of giving an accurate pulse response on the final image for the very high resolution values. Furthermore, it is certain that, with other types of SAR image extraction processing operations such as for example the Doppler-range operation, this phase correction also leads to a deterioration of the pulse response on the image.

To obtain a more efficient parasitic phase compensation, it is observed that the parasitic phase introduced by the demodulation depends on the position of the target in the swath. Now this position depends on the instant considered during the illumination time. It may be expressed not only in range by the variable $\tau+\tau_{df}$ as is the case in the formula of the parasitic phase shift appearing in the expression of the signal received after pulse compression $v_4(\tau,t)$ developed in the relationship (4) but also in azimuth by the variable $\tau_c$. There is therefore an equivalence between the two expressions:

$$\exp\left[i2\pi\frac{1}{2}\alpha(\tau+\tau_{df}-\tau_{mf})^2\right] \Leftrightarrow \exp\left[i2\pi\frac{1}{2}\alpha(\tau_c-\tau_{mf})^2\right]$$

By using this equivalence in the relationship (4), we get:

$$v_4(\tau,t) = w\text{sinc}[B_a\tau] *_\tau \int \gamma(\tau-\tau_c+\tau_{df},t') \times$$

$$\exp\left[i2\pi\frac{1}{2}\alpha(\tau_c(t-t'-T_e/2)-\tau_{mf})^2\right]h_{SAR}(t-t'-T_e/2)dt'$$

It is now easier to determine how to compensate for this parasitic phase in the rest of the SAR image construction processing operation. Indeed, the parasitic phase term is then added to the pulse response of the conventional image focusing filter, which amounts to adopting a modified image focusing filter whose new pulse response is:

$$h_{SAR/das}(t) = h_{SAR}(t)\exp\left[i2\pi\frac{1}{2}\alpha(\tau_c(t)-\tau_{mf})^2\right]$$

Assuming:

$$\tau_c(t) = \tau_{c0} + \tau'_c(t)$$

with $\tau_{c0}$ representing the propagation time at the middle of the illumination time, we get:

$$h_{SAR/das}(t) = h_{SAR}(t)\exp\left[i2\pi\frac{1}{2}\alpha(\tau_{c0}-\tau_{mf})^2\right] \times \quad (5)$$

$$\exp[-i2\pi\alpha(\tau_{c0}-\tau_{mf})\tau'_c(t)]\exp\left[i2\pi\frac{1}{2}\alpha\tau'^2_c(t)\right]$$

The first exponential term:

$$\exp\left[i2\pi\frac{1}{2}(\alpha(\tau_{c0}-\tau_{mf}))^2\right]$$

represents a phase term constant in azimuth that may be compensated for at the end of the image construction processing operation on the table of complex reflection coefficients $\gamma(\tau,t)$ in taking account of the fact that $\tau_{c0}$ then represents the position of the current pixel in the useful swath after compression and not in the useful swath of the final image. Here, it is possible that a difference might arise owing to the number of the negative margin range slots used during the subdivision into range blocks that is done during the image construction processing operation, these range slots being eliminated at the end of processing. This phase term, which has no influence on the radar image constructed out of the moduli of the complex reflection coefficients of each point of the imaged zone, should be compensated for only if it is necessary to know the phase of the complex reflection coefficient, for example when it is desired to carry out interferometical processing operations on radar images of one and the same area taken at different angles.

The second exponential term:

$$\exp[-i2\pi\alpha(\tau_{c0}-\tau_{mf})\tau'_c(t)]\exp\left[i2\pi\frac{1}{2}\alpha\tau'^2_c(t)\right]$$

represents an additional phase term that affects only the Doppler phase history during the illumination time and not the migration path so that it can be added to the traditional pulse response of the image focusing filter. Referring only to the Doppler terms up to the third order, this second exponential term to be taken into account in the expression of the image focusing filter may be placed in the approximate form:

$$\exp i2\pi\frac{\alpha}{f_c}\left\{(\tau_{c0}-\tau_{mf})f_{dc}t + \right.$$

$$\left.\frac{1}{2}\left(f_{dr}(\tau_{c0}-\tau_{mf})+\frac{f_{dc}^2}{f_c}\right)t^2 + \frac{1}{6}\left(f_{dq}(\tau_{c0}-\tau_{mf})+3\frac{f_{dc}f_{dr}}{f_c}\right)t^3\right\}$$

with a mean Doppler $f_{dc}$, a Doppler slope $f_{dr}$ and a Doppler acceleration $f_{dq}$. It is observed that a part of this term depends on the position of the target with respect to the middle of the useful swath. It is possible to take account of this non-stationary character in range at the same time as that of the pulse response of the image focusing filter by the adoption, for the image construction processing operation, of range blocks narrow enough for the two non-stationary characteristics to be overlooked, For the phase correction proper, it is necessary to be capable of expressing the range position corresponding to the term $(\tau_{c0}-\tau_{mf})$ in the range blocks subdivided in the data table obtained after pulse compression, namely demodulation, range Fourier transform, the replacing of the range frequency variable by a range temporal variable and the rearrangement of the range slots of the table in rising order. Looking more closely at the blockwise subdivision of the data table which is done with overlappings to take account of the range migration, and assuming that:

$N_d$ is the number of samples in range or range slots of the data table corresponding to the extent of the useful swath after pulse compression (migrations included), $N_{dbn}$ is the number of range slots of the data table forming the negative margin of a range block, $N_{dpb}$ is the number of range slots of the data table forming the positive margin of the range block, $N_{db}$ is the total number of range blocks, $N_{dbu}$ is the number of useful range slots for the $N_{db}-1$ first blocks, it can be written that the total number of range blocks is equal to:

$$N_{db} = \text{ceil}\left(\frac{N_d-N_{dbn}-N_{dbp}}{N_{dbu}}\right)$$

where ceil designates a function that makes the integer greater than or equal to its argument. The last range block then possesses a number of useful range slots equal to:

$$N'_{dbu} = N_d - N_{dbn} - N_{dbp} - (N_{db}-1)N_{dbu}$$

Thus, the temporal position of the middle of the useful swath after pulse compression is given by:

$$\tau_{mf} = 0.5 \times (N_d-1)T_e$$

and that of the center of the useful portion of each range block by:

$$\begin{cases} \tau_{c0}(k) = [N_{dbm} + kN_{dbu} + 0.5(N_{dbu} - 1)]T_e \\ \tau_{c0}(N_{db} - 1) = [N_{dbn} + (N_{db} - 1)N_{dbu} + 0.5(N'_{dbu} - 1)]T_e \end{cases}$$

$$0 \leq k \leq N_{dbu} - 1$$

It is noted that the absolute temporal position of the first range slot of the swath has not been introduced since the only point of interest is the relative position of a target with reference to the center of the useful swath after pulse compression.

Figure 7:
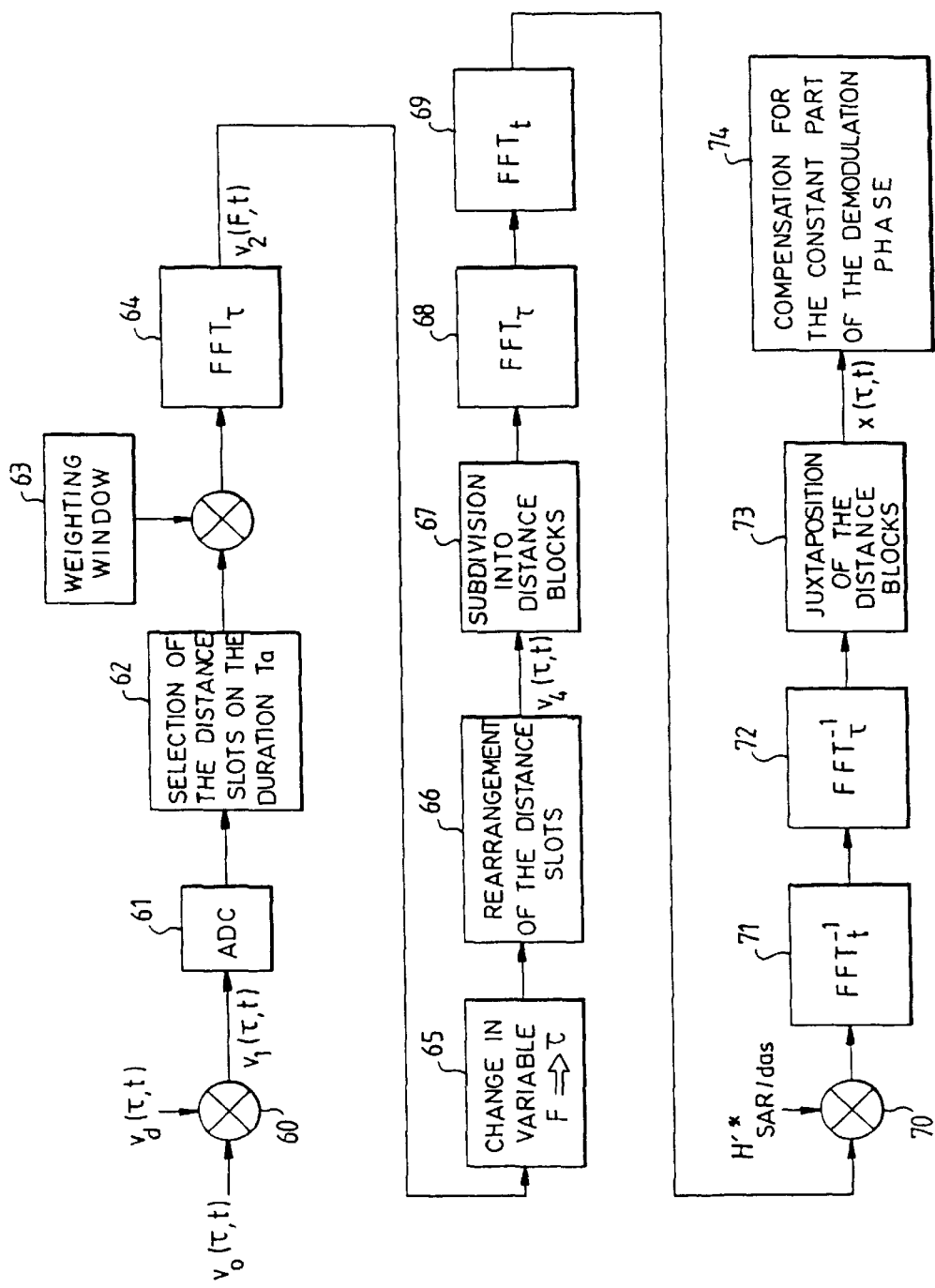
FIG. 7 is a block diagram illustrating the main steps of a processing method according to the invention applied to the reception signal of a Deramp type radar used in synthetic aperture radar in order to carry out radar imaging.

FIG. 7 illustrates the main steps of the processing undergone by the reception signal of a Deramp radar used in a synthetic aperture radar for radar imaging.

The reception signal of the Deramp radar $v_0(\tau,t)$ is first of all demodulated in a demodulator 60 by a demodulation ramp $v_d(\tau,t)$ resuming a part with a duration $T_d$ of the transmitted linear frequency-modulated pulse. It is then converted into digital form and sampled by an analog-digital converter 61 in a 2D range and azimuth data table.

This data table is then subjected to a truncation operation 62 in which zero values are made to replace its data elements belonging to range slots located outside the duration of analysis $T_a$. This duration of analysis $T_a$ begins at the instant of the start of reception of an echo sent back by a target placed in range at the far end of the useful swath and ends at the instant of the end of reception of an echo sent back by a target placed in range at the near end of the useful swath. This operation of truncation is optional when the duration $T_d$ of the demodulation ramp has been limited to the duration of analysis $T_a$. However, this operation is preferable even in this case, for the data elements placed in the range slots of the table external to the duration of analysis $T_a$ constitute parasitic noise.

After the truncation operation 62, the data table is subjected to a weighting window 63 designed to reduce the minor lobes induced by the subsequent image focusing filtering operation whose pulse response is a cardinal sine response.

After weighting by the window 63, the data table with two temporal dimensions, range and azimuth, is subjected to a range Fourier transform 64 aimed at continuing the pulse compression begun with the demodulation 60. The result thereof is a data table formed by range-related and azimuth-related samples of a signal $v_2(F,t)$ studied earlier.

The frequency variable in range F resulting from the Fourier transform in range 64 is then changed into a temporal variable in range $\tau$ during a variable changing step 65. Then the range slots of the table are rearranged during a rearrangement step 66 so that they succeed one another in the table, in a rising order of range. These steps which terminate the pulse compression proper lead to a data table formed by the range-related samples of a signal $v_4(\tau,t)$ that has been studied earlier, this signal being subjected to a slightly modified SAR image construction processing operation.

This SAR processing operation begins, as is usually the case, with a subdivision 67 of the data table into range blocks with overlapping to take account of the phenomenon of range migration. Each block has a span in range that is small enough for the pulse response of the focusing filter and the relationship of parasitic phase variation introduced by the pulse compression to be capable of being considered as being stationary in range. Each range block is then subjected to a range Fourier transform 68 followed by an azimuth Fourier transform 69. Then, its data elements placed in the frequency domains in range and azimuth are multiplied at 70 by the conjugate $H^*_{SAR/das}(t)$ of the transfer function of an image focusing filter modified to take account of a variable phase term introduced by the pulse compression. This modified transfer function is the 2D Fourier transform in range and azimuth of a pulse response $h'_{SAR/das}(t)$ expressed as a function of the pulse response $h_{SAR}(t)$ of a standard image focusing filter by a relationship having the form:

$$h_{SAR/das} = h_{SAR} \exp i 2\pi \frac{\alpha}{f_c} \Bigg\{ (\tau_{c0} - \tau_{mf}) f_{dc} t + \frac{1}{2}\bigg(f_{dr}(\tau_{c0} - \tau_{mf}) + \frac{f_{dc}^2}{f_c}\bigg)t^2 + \frac{1}{6}\bigg(f_{dq}(\tau_{c0} - \tau_{mf}) + 3\frac{f_{dc}f_{dr}}{f_c}\bigg)t^3 \Bigg\}$$

coming from the expression of the modified pulse response $h_{SAR/das}$ in the relationship (5) from which the constant part of the phase term due to demodulation has been removed.

Each range block then has its sample replaced in the temporal range and azimuth domains by a reverse Fourier transform in azimuth 71 followed by a reverse Fourier transform in range 72.

The range blocks are then deprived of their margins of overlapping and juxtaposed at 73 to reconstitute a table of complex reflection coefficients $\gamma(\tau,t)$ of the points of the zone to be imaged, the moduli of these reflection coefficients determining the contrast of each dot of the image.

FIG. 7 shows an additional step 74 in which compensation is provided for the constant part of the phase term due to the pulse compression in order that certain processing operation, such as interferometrical processing operations, may be applied to the image.

The correction just proposed of the parasitic phase term due to the particular pulse compression mode used in a Deramp radar derives its efficiency from the fact that the physical phenomenon forming its basis is taken into account with precision. Furthermore, it has the great value of combining smoothly with standard SAR image construction processing operations and of not significantly increasing the quantity of computations needed for the construction of radar images.

What is claimed is:

1. A method for the processing of the reception signal of a synthetic aperture radar or SAR with frequency ramps to obtain a radar image, said SAR being placed on board a carrier moving above a region of terrain to be imaged that it illuminates, sending out coherently repeated linear frequency-modulated pulses with a duration T, demodulating the echo signal, received in return between each transmitted pulse, by means of a demodulation ramp that is centered in range on the middle of the useful illuminated zone or useful swath, resumes the form of all or part of the transmitted pulse and has a duration $T_d$ smaller than or equal to the duration T of a transmitted pulse, sufficient to cover the reception time interval where the echo signals of all the targets of the useful swath overlap and, after demodulation, delivers an unprocessed video reception signal available in the form of successive samples or reception data elements that are taken at a double rate: a fast rate corresponding to the sequence of range gates and defining a temporal dimension of range $\tau$ along a range axis oriented laterally to the path of the carrier of the SAR and a slow rate corresponding to the succession of recurrences and defining a temporal dimension of azimuth t along an azimuth axis oriented in the direction of shift of the carrier of the SAR, these samples or data elements taking the form of a table of reception data with two dimensions, range and azimuth, said method comprising the following successive processing steps:

the selection of a useful duration $T_a$ for the demodulation beginning at the earliest at the instant of the start of reception of an echo sent back by a target placed in range at the far end of the useful swath and ending at the latest at the instant of the end of reception of an echo sent back by a target placed in range at the near end of the useful swath, the replacement of the data elements of the table of reception data, considered in the range dimension, by their Fourier transform which is one-dimensional in range for the obtaining, after the demodulation, of a type of pulse compression to which there is assigned a parasitic phase term of pulse compression, the rearrangement of the data elements of the table in the range dimension in order to have available data corresponding to an order of moving away that increases in range, the subdivision of the table into overlapping bands, parallel to the azimuth axis, so as to have bands corresponding to narrow zones of range $\tau_i$ where it is possible, as a function of the geometrical parameters of the image taken, to locally determine a image focusing 2D filter having a pulse response $h(\tau,t,\tau_i)$ with two temporal variables, namely $\tau$ range and t azimuth, and a function of correction of the parasitic phase due to the pulse compression, that are stationary in the range band $\tau_i$, the filtering of the table bands by the image focusing 2D filter whose pulse response has been modified by the parasitic phase correction function, and the juxtaposition of the table bands resulting from the filtering to obtain a table of complex reflection coefficients of the points of the illuminated region of ground, and the construction of an image of the illuminated region from the moduli of the complex reflection coefficients represented in the table obtained in the previous step.

2. A method according to claim 1, wherein the useful duration $T_a$ of demodulation is selected by the adoption of a demodulation ramp whose duration $T_d$ corresponds to this useful duration of demodulation $T_a$.

3. A method according to claim 1, wherein the selection of the useful duration $T_a$ of demodulation is done on the 2D table of reception data as it is delivered by the radar, before this table has undergone the one-dimensional range Fourier transform, by the withdrawal of the reception data elements arriving on the range axis outside the useful duration $T_a$ chosen and the replacement of these data elements by zero values.

4. A method according to claim 1, wherein the 2D filtering of the table bands by the image focusing 2D filter, whose pulse response has been modified by the parasitic phase correction function, is performed on each band of the table of data elements, by going into the spaces of the range and azimuth frequencies, by two one-dimensional direct Fourier transform operations performed successively in the range dimension and then in the azimuth dimension.

5. A method according to claim 1 furthermore consisting of the application, to the phases of the complex reflection coefficients of the illuminated ground zone that are obtained after juxtaposition of the table bands resulting from the filtering operation, of a second correction function that complements the effect of the first function applied to the pulse response of the image focusing filter.

6. A method according to claim 1, wherein said parasitic phase correction function used to modify the pulse response of the image focusing filter has the following expression:

$$\exp[-i2\pi\alpha(\tau_{c0} - \tau_{mf})\tau'_c(t)]\exp\left[i2\pi\frac{1}{2}\alpha\tau'^2_c(t)\right]$$

$\alpha$ being the slope of linear frequency-modulation of the pulses transmitted, $\tau_{c0}$ being the temporal position in range of a target in the middle of its time of illumination by the radar moving past in azimuth on its path, i.e. the temporal position in range from the center of the useful portion of each block;

$\tau_{mf}$ being the temporal position in range of a target located in the middle of the useful swath, and $\tau'_c(t)$ being a function of the azimuth defined by:

$$\tau'_c(t)=\tau_c(t)-\tau_{c0}$$

where $\tau_c(t)$ is the propagation time of the echo signal from a target that varies with the azimuth.

7. A method according to claim 5, wherein said second phase correction function used to modify the phases of the complex correction coefficients of the illuminated ground zone obtained after juxtaposition of the table bands resulting from the filtering has the following expression:

$$\exp\left[i2\pi\frac{1}{2}(\alpha(\tau_{c0} - \tau_{mf}))^2\right]$$

$\alpha$ being the slope of linear frequency-modulation of the pulses transmitted, $\tau_{c0}$ being the temporal position in range of a target in the middle of its time of illumination by the radar moving past in azimuth on its path, i.e. the temporal position in range from the center of the useful portion of each block;

$\tau_{mf}$ being the temporal position in range of a target located in the middle of the useful swath.

* * * * *